United States Patent
Ukei et al.

(10) Patent No.: US 8,394,478 B2
(45) Date of Patent: Mar. 12, 2013

(54) PRESSURE-SENSITIVE ADHESIVE SHEET WITH RELEASE LINER

(75) Inventors: Hiroichi Ukei, Ibaraki (JP); Yoshio Nakagawa, Ibaraki (JP); Osamu Degawa, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 763 days.

(21) Appl. No.: 11/858,614

(22) Filed: Sep. 20, 2007

(65) Prior Publication Data

US 2008/0081143 A1   Apr. 3, 2008

(30) Foreign Application Priority Data

Sep. 22, 2006   (JP) ................. 2006-256846

(51) Int. Cl.
*B32B 3/30*      (2006.01)
*B32B 7/06*      (2006.01)
*B32B 27/18*     (2006.01)
*B32B 27/32*     (2006.01)

(52) U.S. Cl. ............. 428/41.3; 428/40.1; 428/41.8; 428/156; 428/163; 428/167; 428/172; 428/220; 428/337; 428/500; 428/523; 524/500; 524/515; 524/528; 525/191; 525/192; 525/196; 525/240; 525/326.1; 525/333.7; 525/371; 525/384

(58) Field of Classification Search .............. None
See application file for complete search history.

(56) References Cited

U.S. PATENT DOCUMENTS

| | | | |
|---|---|---|---|
| 3,971,866 A * | 7/1976 | Johnson | 428/41.4 |
| 4,151,344 A * | 4/1979 | Doss et al. | 528/34 |
| 4,514,534 A * | 4/1985 | DiNardo | 524/108 |
| 4,522,887 A * | 6/1985 | Koebisu et al. | 428/461 |
| 4,638,015 A * | 1/1987 | Bertrand | 521/85 |
| 5,178,924 A * | 1/1993 | Johnson et al. | 428/41.4 |
| 5,213,743 A * | 5/1993 | Ohara et al. | 264/171.23 |

(Continued)

FOREIGN PATENT DOCUMENTS

| EP | 216300 A2 * | 4/1987 |
|---|---|---|
| EP | 1 506 984 A1 | 2/2005 |

(Continued)

OTHER PUBLICATIONS

Machine Traslation of EP 216300 A2, Apr. 1987.*

(Continued)

*Primary Examiner* — David Sample
*Assistant Examiner* — Jeff Vonch
(74) *Attorney, Agent, or Firm* — Leydig, Voit & Mayer, Ltd.

(57) ABSTRACT

A release liner formed of a highly recyclable polypropylene-based resin sheet and capable of assuring excellent operability over a wide range of environmental temperature is provided. A pressure-sensitive adhesive (PSA) sheet with release liner is also provided. A PSA sheet with release liner according to the present invention comprises a PSA sheet including a support and a PSA layer; and a release liner formed of a polypropylene-based resin sheet which is obtained by molding into a sheet a polypropylene-based resin composition containing a nucleating agent. The PSA sheet with release liner provides excellent operability even in a high temperature environment of, for example, about 35° C. The PSA sheet with release liner is preferably applicable in an attachment operation wherein the PSA sheet is attached to an adherend while the liner is released from the PSA sheet.

14 Claims, 4 Drawing Sheets

U.S. PATENT DOCUMENTS

| | | | |
|---|---|---|---|
| 6,461,706 B1* | 10/2002 | Freedman et al. | 428/40.1 |
| 6,689,441 B1* | 2/2004 | Kim | 428/40.1 |
| 6,759,110 B1* | 7/2004 | Fleming et al. | 428/41.8 |
| 6,969,556 B2 | 11/2005 | Jeschke | |
| 6,982,107 B1* | 1/2006 | Hennen | 428/40.1 |
| 2003/0039826 A1* | 2/2003 | Sun et al. | 428/354 |
| 2003/0152695 A1* | 8/2003 | Sher et al. | 427/207.1 |
| 2004/0110019 A1* | 6/2004 | Schubert et al. | 428/515 |
| 2004/0143070 A1* | 7/2004 | Jeschke | 525/216 |
| 2004/0216833 A1 | 11/2004 | Fleming et al. | |
| 2005/0266195 A1* | 12/2005 | Nonaka et al. | 428/40.1 |
| 2006/0019069 A1 | 1/2006 | Ikishima et al. | |
| 2006/0155073 A1* | 7/2006 | Oobayashi et al. | 525/242 |

FOREIGN PATENT DOCUMENTS

| | | |
|---|---|---|
| EP | 1 719 808 A2 | 11/2006 |
| JP | 60203653 A * | 10/1985 |
| JP | 2001-301106 A | 10/2001 |
| JP | 2004-506777 A | 3/2004 |
| JP | 2004-512400 A | 4/2004 |
| JP | 2006-028416 A | 2/2006 |
| WO | WO 00/13888 A1 | 3/2000 |
| WO | WO 02/14447 A1 | 2/2002 |
| WO | WO 02/051626 A1 | 7/2002 |
| WO | WO 2004/046214 A2 | 6/2004 |

OTHER PUBLICATIONS

English Translation of JP 60203653 A, Oct. 1985.*
Avalos et al., Crystallization kinetics of polypropylene: 1. Effect of small additions of low-density polyethylene, Nov. 1996, Polymer vol. 37 No. 25, pp. 5681-5688.*
Long et al., Crystallization Behaviour of Isotactic Polypropylene/Linear Low Density Polyethylene Blends, 1991 (no month), Polymer International 26, pp. 143-146.*
Shanks et al., Miscibility and crystallisation of polypropylene—linear low density polyethylene blends, 2001 (no month), Polymer 42, pp. 1941-1951.*
European Patent Office, Extended European Search Report in European Application No. 07 018 637.4 (Nov. 14, 2007).
European Patent Office, Communication Pursuant to Article 94(3) EPC in European Application No. 07 018 637.4 (Oct. 27, 2008).
European Patent Office, Communication Pursuant to Article 94(3) EPC in European Application No. 07 018 637.4 (Jun. 11, 2010).
Japanese Patent Office, Notification of Reasons for Rejection in Japanese Patent Application No. 2006-256846 (Sep. 15, 2011).
European Patent Office, Communication Pursuant to Article 94(3) EPC in European Application No. 07 018 637.4 (Jan. 7, 2011).
Chinese Patent Office, First Notice of the Opinion on Examination in Chinese Patent Application No. 200710161842.5 (Jan. 4, 2012).

* cited by examiner

PRESSURE-SENSITIVE ADHESIVE SHEET WITH RELEASE LINER

BACKGROUND OF THE INVENTION

1. Field of the Invention

The present invention relates to a pressure-sensitive adhesive sheet with release liner comprising a release liner on a pressure-sensitive adhesive layer; and more particularly to a pressure-sensitive adhesive sheet with release liner, which is excellent in operability when releasing the release liner from the pressure-sensitive adhesive sheet and also in recyclability of the release liner. The present invention also relates to a release liner for a pressure-sensitive adhesive sheet, which is excellent in the operability of its release from the pressure-sensitive adhesive sheet as well as in recyclability.

The present application is filed claiming the benefit of the priority based upon Japanese Patent Application No. 2006-256846 filed on Sep. 22, 2006, the entirety of which is incorporated herein by reference.

2. Description of the Related Art

As a release liner for a pressure-sensitive adhesive (PSA) sheet, there has been known a release liner formed of a substrate having a polyethylene (PE) film laminated on a paper core member (release paper). Recently, for the purpose of facilitating air bubble exclusion at the time of PSA sheet attachment or the like, there has been developed a PSA sheet with release liner constructed in a way that an uneven structure formed on a surface of the release liner is transferred to the surface of the PSA layer. As related art documents on this type of technology, Japanese Patent Application Publication Nos. 2004-506777 and 2006-028416 are available. A release liner formed of a PE film laminated on a paper core member is preferably applicable as a release liner having an uneven structure on a surface thereof. For instance, an example in Japanese Patent Application Publication No. 2004-506777 (paragraph 0043) uses a release liner including a paper core member coated with PE on both surfaces thereof.

A release liner (hereinafter, occasionally referred to simply as a "liner") having a PE layer on a surface of a paper core member in this manner generally has advantages connected with the nature of paper, which are that the liner is separated (released) from the PSA sheet with high operability and that the operability is not so greatly influenced by temperature. However, a liner of such a structure cannot be separated into paper and resin (PE) after use (i.e., after being released from the PSA sheet) and thus is not recyclable. In the case of a liner using paper, the liner itself or the PSA sheet including the liner tends to be undulating due to the surface roughness of the paper grain. This spoils the external appearance of the liner.

There has also been offered a liner with no paper core member. For example, Japanese Patent Application Publication No. 2004-506777, paragraph 0022, describes a liner with PE having silicone release coating covering (laminated on) the surface of polyethylene terephthalate (PET), a liner formed of cast polypropylene film having silicone release coating, and the like.

Polyolefins such as polyethylene, and polyethylene terephthalate are different types of resin. For the purpose of further improving recyclability, more preferable is a liner which is recyclable as a polyolefin material not containing a different type of resin (PET, etc.). For example, in terms of recyclability, a liner formed of a single-layer of polypropylene-based resin (i.e., not laminated on a different type of resin) is preferable.

However, a liner formed of a synthetic resin (especially, a single layer of thermoplastic resin), as compared with a liner having a paper core member, is more likely to be influenced by the environmental temperature in terms of operability when the liner is released from the PSA sheet. For this reason, for example, even release conditions (release posture, release speed, release force, etc.) that realize a smooth release of a liner from a PSA sheet in the environment of 23° C. may not consistently realize a smooth release at a higher temperature exceeding 30° C. (e.g., about 35° C.). This may lead to such as a decrease in the operability. Especially, in a PSA sheet attachment process carried out in such a way that while the liner is being released from the PSA sheet, the PSA sheet is simultaneously being attached to an adherend, there may occur problems such as the liner getting stuck (jammed) unless the smooth release of the liner is maintained.

SUMMARY OF THE INVENTION

An object of the present invention is to provide a release liner formed of a highly recyclable polypropylene-based resin sheet and capable of assuring excellent operability over a wide range of temperature. Another object of the present invention is to provide a PSA sheet with release liner comprising such a release liner.

The present invention provides a PSA sheet with release liner (hereinafter, referred to as "release-lined PSA sheet"), comprising: a PSA sheet including a support and a PSA layer retained by the support; and a release liner formed of a polypropylene-based resin sheet, the liner being provided on the PSA layer. The polypropylene-based resin sheet is obtained by forming a polypropylene-based resin composition containing a nucleating agent into a sheet. In one preferable embodiment, the polypropylene-based resin sheet has a thickness of about 50 μm to 300 μm.

The release liner included in the release-lined PSA sheet is formed of a polypropylene-based resin sheet (typically, a single layer polypropylene resin sheet) and therefore is superior in recyclability to a release liner containing a paper core member and a release liner laminated with different kinds of resins (e.g., a release liner laminated with a PET and PE layers). Because the resin sheet is formed of a polypropylene-based resin composition containing a nucleating agent, it is superior in rigidity and heat resistance to a polypropylene-based resin sheet formed of a usual polypropylene-based resin composition containing no nucleating agent. For example, the resin sheet formed of a polypropylene-based resin composition containing a nucleating agent may maintain an appropriate bending strength allowing a smooth release from the PSA sheet even in a high temperature environment of, for example, about 35° C. A release-lined PSA sheet equipped with such a release liner is excellent in operability when the liner is released from the PSA sheet (and thus, in attachment operability of the PSA sheet).

In one preferable embodiment of the release-lined PSA sheet disclosed herein, the polypropylene-based resin composition (containing a nucleating agent) used for forming the resin sheet fulfills the following criteria: When formed into a sheet having a thickness of 200 μm, the polypropylene-based resin composition provides a polypropylene-based resin sheet having a bending strength in the range of 0.8 to 2 N/38 mm, where the bending strength is measured at a measuring temperature of 35° C. by bending lengthwise a test piece having a width of 38 mm and a length of 100 mm into a U shape by bringing both ends thereof closer to each other at a rate of 300 mm/min. until the distance between the ends becomes 10 mm.

A release-lined PSA sheet equipped with a release liner formed of such a composition may especially be excellent in operability upon releasing the liner from the PSA sheet (and thus, in attachment operability of the PSA sheet) even at a high temperature environment of, for example, about 35° C.

In another preferable embodiment of the release-lined PSA sheet disclosed herein, the polypropylene-based resin composition (containing a nucleating agent) used for forming the resin sheet fulfills the following criteria: When formed into a sheet having a thickness of 200 μm, the polypropylene-based resin composition provides a polypropylene-based resin sheet having a bending strength in the range of 1 to 3 N/38 mm, where the bending strength is measured at a measuring temperature of 23° C. by bending lengthwise a strip-like test piece having a width of 38 mm and a length of 100 mm into a U shape by bringing both ends thereof closer to each other at a rate of 300 mm/min. until the distance between the ends becomes 10 mm.

A release lined PSA sheet equipped with a release liner formed of such a composition may especially be excellent in operability when the liner is released from the PSA sheet (and thus, in attachment operability of the PSA sheet) at room temperature (about 23° C.). More preferable is to use a polypropylene-based resin composition which provides a polypropylene-based resin sheet having a bending strength at a measuring temperature of 35° C. and a bending strength at a measuring temperature of 23° C. in the preferable ranges disclosed herein.

The release-lined PSA sheet disclosed herein is preferably applicable as a release-lined PSA sheet, in which an uneven structure is provided to the surface of the release liner on the PSA layer side. The uneven structure may be ridge-like projections extending in parallel to each other at a pitch of about 100 μm to 1000 μm. The height of the projections may be about 5 μm to 50 μm.

The present invention also provides a liner formed of a polypropylene-based resin sheet obtained by forming a polypropylene-based resin composition containing a nucleating agent into a sheet having a thickness of 100 μm to 300 μm. The polypropylene-based resin composition, when formed into a sheet having a thickness of 200 μm, may provide a polypropylene-based resin sheet having a bending strength in the range of about 0.8 to 2 N/38 mm, where the bending strength is measured at a measuring temperature of 35° C. by bending lengthwise a test piece having a width of 38 mm and a length of 100 mm into a U shape by bringing both ends thereof closer to each other at a rate of 300 mm/min. until the distance between the ends becomes 10 mm.

The release liner having such a configuration is formed of a polypropylene-based resin sheet and therefore is superior in recyclability to a release liner containing a paper core member and a release liner laminated with different types of resins. The resin sheet is formed of a polypropylene-based resin composition containing a nucleating agent and therefore is excellent in rigidity and in heat resistance as compared to a polypropylene-based resin sheet formed of a usual polypropylene-based resin composition (i.e., the polypropylene-based resin composition containing no nucleating agent). The resin sheet formed of a polypropylene-based resin composition containing a nucleating agent may maintain an appropriate bending strength allowing a smooth release from the PSA sheet even in a high temperature environment of, for example, about 35° C. Therefore, the above-described liner is preferably usable as a release liner for forming a release-lined PSA sheet excellent in operability when the liner is released from the PSA layer (and thus, in attachment operability of the PSA sheet).

In one preferable embodiment of the release liner disclosed herein, the polypropylene-based resin sheet has a thickness of 50 μm to 300 μm. It is preferable that the release liner be such that the polypropylene-based resin composition (containing a nuclear agent) used for forming the polypropylene-based resin sheet is a polypropylene-based resin composition that can provide a polypropylene-based resin sheet having a bending strength in the range of about 1 to 3 N/38 mm, where the bending strength is measured at a measuring temperature of 23° C. by bending lengthwise a strip-like test piece having a width of 38 mm and a length of 100 mm into a U shape by bringing both ends thereof closer to each other at a rate of 300 mm/min. until the distance between the ends becomes 10 mm. At least one surface of the release liner (typically, the surface to be attached to the PSA sheet when the release liner is used for forming a release-lined PSA sheet) may have projections having a height of about 5 μm to 50 μm generally in parallel to each other at a pitch of about 100 μm to 1000 μm.

DETAILED DESCRIPTION OF THE INVENTION

Hereinafter, preferable embodiments according to the present invention will be described. The matter which is other than that specifically referred to in this specification but is necessary for carrying out the present invention may be understood as a matter of design choice for those skilled in the art based on the conventional art. The present invention can be carried out based on the contents disclosed in this specification and the technological common knowledge in the art.

A release-lined PSA sheet disclosed herein includes a PSA sheet having a PSA layer, and a liner placed on the PSA layer.

A PSA sheet constructing such a release-lined PSA sheet includes a support and a PSA layer retained by the support. The PSA sheet may be such that it has a PSA layer on one surface, or both surfaces, of the support (substrate). Herein, the concept of "PSA sheet" may encompass items so-called PSA tape, PSA label, PSA film and the like. The PSA layer does not need to be continuous, but may be in a pattern of, for example, regularly or randomly arranged dots, stripes, or the like.

The liner (release liner) constructing the release-lined PSA sheet is substantially formed of a polypropylene-based resin sheet (hereinafter, occasionally referred to as a "PP sheet"), which is obtained by forming a polypropylene-based resin composition into a sheet. The term "polypropylene-based resin composition" refers to a composition that contains, as a base polymer (main component among the polymer components), a propylene-based polymer, which is based on propylene as the main monomer (main monomer component). The concept of "propylene-based polymer" may encompass both homopolymer of propylene (homopolypropylene, typically isotactic polypropylene and copolymer of propylene and another monomer(s) (e.g., one, two or more kinds selected from α-olefin having 2 or 4 to 10 carbon atoms). The copolymer may be a random copolymer (random polypropylene) or a block copolymer. It may also be a polypropylene-based resin composition containing, at an arbitrary ratio, two or more kinds of propylene-based polymers (e.g., a combination of a homopolypropylene and a random polypropylene, a combination of two kinds of random polypropylenes in different copolymer compositions, etc.).

The polypropylene-based resin composition (hereinafter, occasionally referred to as a "PP composition") may contain, as a secondary component, a polymer component other than the propylene-based polymer (base polymer). Such a secondary polymer component may be any of various polymers miscible or immiscible with the propylene-based polymer. The secondary polymer component content (when two or more secondary polymer components are contained, their total content) may be, for example, with respect to 100 parts by mass of the propylene-based polymer, 70 parts by mass or less (typically, 0.1 to 70 parts by mass), preferably 50 parts by mass or less (typically, 0.1 to 50 parts by mass), and more preferably 20 parts by mass or less (typically, 0.1 to 20 parts by mass). The secondary polymer component content may be 5 parts by mass or less (typically, 0.1 to 5 parts by mass) with respect to 100 parts by mass of the propylene-based polymer. The PP composition may contain no secondary polymer component (i.e., formed of only one, two or more kinds of propylene-based polymers as the polymer components).

In the PP composition containing a secondary polymer component, a polymer which is recyclable as a polyolefin-based material together with the propylene-based polymer (i.e., without separating the secondary polymer component from the propylene-based polymer) may be contained as the secondary polymer component. For example, preferable is an olefin-based polymer composed mainly of ethylene or α-olefin having 4 or more carbon atoms (typically, an ethylene-based polymer). Here, the "ethylene-based polymer" may encompasses homopolymer of ethylene, copolymer of ethylene and another monomer (e.g., one, two or more kinds selected from α-olefins having 3 to 10 carbon atoms), and the like. Hence, the concept of "ethylene-based polymer" may encompass so-called low density polyethylene (LDPE), linear low density polyethylene (LLPDE), high density polyethylene (HDPE), and the like.

In one preferable embodiment of the release liner disclosed herein, the PP composition contains an ethylene polymer (e.g., LDPE, typically, linear LDPE) as the secondary polymer component, in addition to the propylene-based polymer (e.g., homopolypropylene). The ethylene polymer content may be, for example, about 1 to 50 parts by mass (preferably about 5 to 20 parts by mass) with respect to 100 parts by mass of the propylene-based polymer.

In another preferable embodiment, the PP composition contains substantially no polymer component other than the propylene-based polymer and the olefin-based polymer (typically, ethylene polymer). A release liner formed of a PP composition having such a composition is especially excellent in recyclability (e.g., recyclability as the polyolefin material).

In the release liner disclosed herein, the PP composition used for forming the PP sheet (pp-sheet forming material) contains a nucleating agent. A PP sheet formed of a PP composition containing a nucleating agent is superior in rigidity and heat resistance to a PP sheet formed of a usual PP composition (without a nucleating agent). Such a PP sheet excellent in rigidity and heat resistance can realize a liner maintaining an appropriate bending strength allowing a smooth release from a PSA sheet even in a high temperature environment (e.g., about 35° C.). Such a PP sheet may also realize a liner that exhibits little difference in release operability between room temperature (typically, about 23° C.) and a high temperature). A PP composition containing a nucleating agent may be, as described later, molded into a sheet by feeding the pre-melted composition between rolls, thereby forming a PP sheet, which reflects the surface structure (e.g., bumps and recesses) of the roll(s) more clearly. A PP composition containing a nucleating agent disclosed herein can realize at least one of the above-described effects.

As the nucleating agent, can be used any of various substances exhibiting a nucleating activity on polyolefins (e.g., polypropylene-based resin). For example, the following substances are preferably usable as the nucleating agent.

A compound represented by the following formula 1 (aluminum hydroxy-di-p-tert-butylbenzoate)

[Chemical formula 1]

A compound represented by the following formula 2 (sodium 2,2-methylene-bis-(4,6-di-tert-butylphenyl)phosphate)

[Chemical formula 2]

A phosphate ester salt represented by the following formula 3

[Chemical formula 3]

In formula 3, $R^1$ is a hydrogen atom or an alkyl group having 1 to 4 carbon atoms. $R^2$ and $R^3$ are each any one independently selected from a hydrogen atom and alkyl groups having 1 to 12 carbon atoms (e.g., a tert-butyl group). M is a metal atom belonging to group III or IV in the periodic table. X is a valence of the metal M.

A sorbitol-based compound represented by the following formula 4

[Chemical formula 4]

(4)

In formula 4, $R^4$ and $R^5$ are each any one independently selected from a hydrogen atom and alkyl groups having 1 to 5 carbon atoms.

In addition to the above, a metal salt of rosin, for example, is usable as the nucleating agent.

For the nucleating agent, the above-mentioned substances may be used singly or in combination of two or more. The mixing ratio of the nucleating agent to the PP composition disclosed herein may be, for example, about 0.01 to 3 parts by mass (preferably, 0.02 to 2 parts by mass) with respect to 100 parts by mass of the propylene-based polymer (when two or more propylene-based polymers are contained, their total mass) contained in the PP composition.

The PP composition may contain any of various components which are generally known as additives usable for polyolefin-based resin compositions as long as the effects of the present invention are not significantly spoiled. Examples of such components include antioxidant, neutralizer, thermostabilizer, photostabilizer, ultraviolet absorber, antistatic agent, slip agent, anti-blocking agent, colorant (pigment, dye, etc.) and the like. The PP composition may contain a pigment such as $TiO_2$ or the like at a ratio of about 5 to 20 parts by mass with respect to 100 parts by mass of the propylene-based polymer.

The release liner disclosed herein is substantially formed of a PP sheet obtained by forming the above-described PP composition into a sheet form. Typically, the release liner is consisting of a PP sheet obtained by forming the above-described PP composition into a sheet form. Both surfaces (i.e., both surfaces defining the thickness) of the PP sheet may be smooth, or one or both surfaces of the PP sheet may have an uneven structure (bumps and recesses).

In one preferable embodiment, the PP sheet has regular or irregular (typically, regular) bumps and recesses on the surface on the PSA layer side (the surface to be attached to the PSA layer). The bumps and recesses may be provided in the entire surface on the PSA layer side or a partial area thereof (e.g., a part of the width and/or a part of the length). The surface of the PP sheet on the non-PSA layer side (the surface not to be attached to the PSA layer) may be smooth or supplied entirely or partially with an uneven structure (bumps and recesses) similar to or different from the surface on the PSA layer side.

The uneven structure (bumps and recesses) of the surface on the PSA layer side may be a plurality of ridge-like projections (ridges) extending in parallel to each other at a predetermined pitch (interval between adjacent ridges). The uneven structure may have a first group of ridges extending in parallel to each other in one direction and a second group of ridges extending in parallel to each other in a direction intersecting (typically, intersecting perpendicularly) the direction of the first group. The uneven structure may have a third, a fourth ... groups of ridges. When a release liner formed of a PP sheet having such uneven structure provided on the surface of the PSA layer side is used as an element of a release-lined PSA sheet, the uneven structure is transferred to the PSA layer of the PSA sheet, thereby providing a PSA sheet with good air exclusion ability. Alternatively, the PSA layer formed on the surface of the release liner having the uneven structure may be transferred to the support, thereby providing a PSA sheet with good air exclusion ability.

The shape of a cross-section of each ridge (cross-section vertical to the direction in which each ridge extends) of the aforementioned ridge groups may be, for example, rectangular, trapezoidal (typically, the upper side is shorter than the lower side), inverted V-shaped, inverted U-shaped, semicircular or the like. The height of the ridge may be, for example, about 5 μm to 50 μm. The width of the ridge (typically, the width of the bottom of the ridge) may be, for example, about 10 μm to 200 μm (preferably, about 15 μm to 35 μm). The cross-sectional shape of the ridges (height, width, etc.) may be the same or different. For example, the cross-sectional shape of the ridges may be generally the same. Ridges of different cross-sectional shapes may be distributed regularly or randomly. The pitch of the projections (ridges) constituting the ridge groups may be, for example, about 100 μm to 1000 μm. When a plurality of ridge groups extend in directions intersecting each other, the cross-sectional shape of the ridges belonging to each group may be the same or different. The pitch of the ridges belonging to each group may be the same or different.

In one preferable embodiment, a first and a second ridge groups intersecting perpendicularly to each other are provided on the entire surface of the PSA layer side of the PP sheet. The projections belonging to the each ridge group have the same cross-sectional shape, and the cross-sectional shape of the projections in the first ridge group is the same as that of the projections in the second ridge group. The cross-sectional shape is generally trapezoidal with the upper side being shorter than the lower side. In more detail, for example, the height is about 5 μm to 30 μm, the length of the lower side is about 40 μm to 80 μm, and the length of the upper side is about 3 μm to 60 μm (yet shorter than the lower side). The pitch of the projections in the first ridge group is approximately the same (typically, the same) as the pitch of the projections in the second ridge group. The pitch is preferably about 100 μm to 1000 μm (e.g., about 400 μm to 600 μm). A release liner having such an uneven structure on a surface is used as an element of a release-lined PSA sheet, thereby providing a PSA sheet with especially good air exclusion ability. In addition, transferring the PSA layer formed on the release liner to a support can produce a PSA sheet with especially good air exclusion ability.

The thickness of the PP sheet may be, for example, about 50 μm to 500 μm. The thickness may be about 50 μm to 300 μm. For the purpose of consistently affording high release operability (especially, release operability in a high temperature environment), the thickness of the sheet is preferably about 100 μm to 300 μm, and more preferably about 150 μm to 250 μm. As described above, in a PP sheet having ridge-like projections at least on the surface of the PSA layer side, the thickness measured from the tip of the projection (i.e., the thickness including the projection) is preferably about 500 μm or less (preferably about 300 μm or less, more preferably about 250 μm or less, but typically about 150 μm or more). The thickness excluding the projection is preferably about 50 μm or greater (preferably about 100 μm or greater, but typically 200 μm or less).

There is no specific limitation on the method for producing a PP sheet from the PP composition, and can be appropriately used any conventionally known method for producing a polyolefin-based resin sheet (e.g., PP sheet). According to one preferable method, a PP composition is extruded in a melted state, fed between the rolls while being cooled and molded into a sheet (melt extrusion method).

Figure 4:
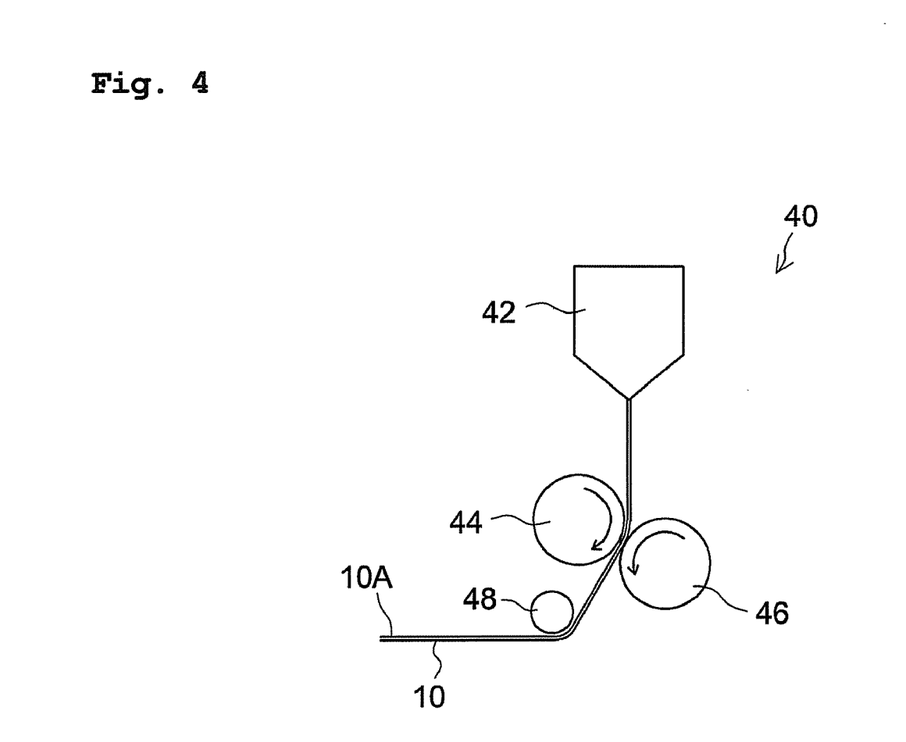
FIG. 4 schematically shows an example of a structure of a sheet-forming apparatus.

With reference to FIG. 4, a typical embodiment of the pp-sheet forming method will be described. A sheet forming (molding) apparatus 40 shown in FIG. 4 roughly includes an extrusion molding machine having a T-die 42, and a pair of cooling rolls 44 and 46 facing each other. A PP composition heat-melted at a predetermined temperature is extruded through the T-die 42 to form a strip. While being fed between the cooling rolls 44 and 46, the extruded PP composition is cooled and solidified into a sheet having a surface structure reflecting the surface structure of the rolls 44 and 46. Thus, a PP sheet 10 is formed. The PP sheet 10 discharged from the cooling rolls 44 and 46 is guided to a take-up roll (not shown) via a pulling roll 48. Thus, the elongated PP sheet 10 is formed of the PP composition.

By using, for example, a roll having an uneven structure on its surface as the cooling roll 44, the uneven structure of the cooling roll 44 can be reflected (transferred) on a surface 10A of the PP sheet 10 on the side of the cooling roll 44. For example, for forming a PP sheet 10 having a surface 10A on which a first and a second ridge groups intersecting perpendicularly to each other are provided at a predetermined pitch (interval between adjacent ridges), may be used a cooling roll 44 having a surface structured with, corresponding to the ridge groups, a first and a second groups of grooves intersecting perpendicularly to each other, the grooves being distributed at the predetermined pitch. When a PP composition containing a nucleating agent as described above is used, the resultant PP sheet 10 may reflect the surface structure of the cooling roll 44 more appropriately (e.g., more precisely) than when a PP composition with no nucleating agent is used.

The method for providing the surface of the PP sheet with uneven structure is not limited to this. For example, can be employed a method such that a pattern is heat-pressed to a PP sheet once solidified, thereby transferring the surface structure of the pattern to the surface of the PP sheet, or a method such that the surface of the PP sheet is laser-processed. Two or more of these methods may be used in combination.

A PP composition disclosed herein may realize a PP sheet having a bending strength in the range of about 0.8 to 2 N/38 mm at a measuring temperature of 35° C. when formed into a sheet having a thickness of 200 μm (i.e., when the thickness of the PP sheet is 200 μm). A liner constructed with a PP sheet formed of such a PP composition is preferable as an element of a release-lined PSA sheet which provides high release operability even at a high temperature environment of about 35° C. It is preferable to set the composition (nucleating agent type and content, presence/absence of a secondary polymer component or various additives and its (their) type(s) and content(s) if used, etc.) of the PP sheet such that such a preferable bending strength is realized.

Herein, "bending strength" is measured such that, at a predetermined temperature, a test piece of 38 mm width×100 mm length is bent from a linearly extended state into a U shape, by bringing both ends closer to each other at a rate of 300 mm/min. until the distance between the both ends becomes 10 mm.

Figure 8:
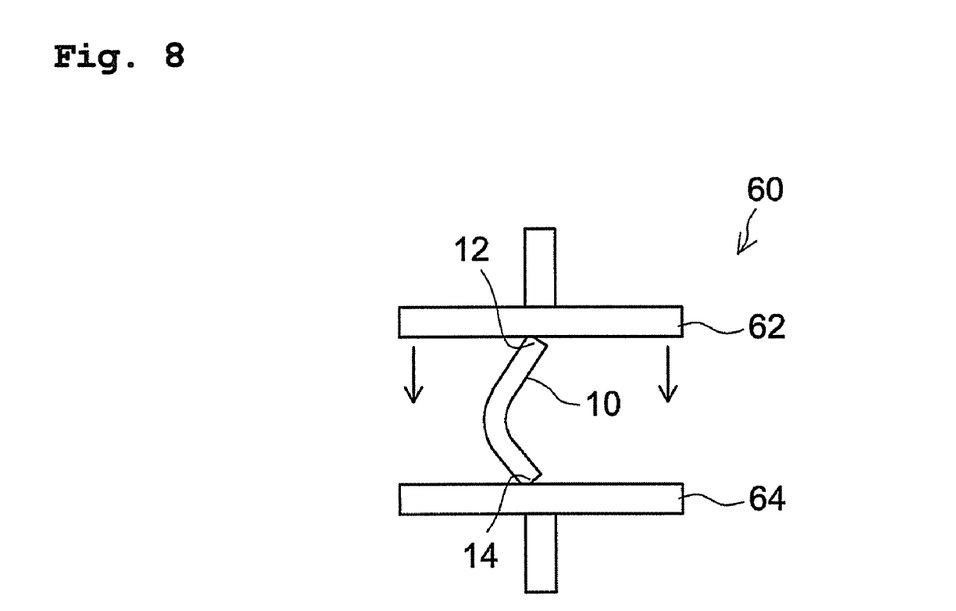
FIG. 8 schematically shows a method for measuring the bending strength.

Bending strength can be measured, for example, using an apparatus shown in FIG. 8. A bending strength measuring apparatus 60 includes a pair of press plates, i.e., an upper plate 62 and a lower plate 64, which are placed in parallel to each other (and typically horizontally). A driving device (not shown) is coupled to the upper plate 62, and the upper plate 62 can be moved up and down at an arbitrary speed while being kept parallel to the lower plate 64 (the distance between the upper plate 62 and the lower plate 64 can be changed). The driving device includes a detector (not shown), and with this can be measured the magnitude of the resisting force of the sample sheet on the place 62 moving downward.

For measuring bending strength, at a predetermined environmental temperature (measuring temperature), a PP sheet (a test piece) 10 of the above-described shape in a linearly extended state is vertically retained between the upper plate 62 and the lower plate 64 such that one end 12 of the length of the PP sheet and the other (opposite) end 14 are contacting the upper plate 62 and the lower plate 64, respectively. Hence, the distance between the upper plate 62 and the lower plate 64 is 100 mm at the start of a measurement. While the lower plate 64 is kept at a fixed position, the upper plate 62 is moved down toward the lower plate 64 at a rate of 300 mm/min. until the distance to the lower plate 64 becomes 5 mm (i.e., until the upper plate 62 is moved down by 95 mm from the initial position). By moving down the upper plate 62 in this way, the ends 12 and 14 of the test piece 10 are brought closer to each other while the test piece 10 is bent into a U-shape as shown in FIG. 8. The magnitude of the force required to bend the test piece 10 (compressive force) is monitored by the above-mentioned detector. The bending strength (N/38 mm) of the test piece at the aforementioned temperature is defined as the value detected when the distance between the upper plate 62 and the lower plate 64 (i.e. the distance between the ends 12 and 14 of the test piece 10) becomes 10 mm, namely, when the upper plate 62 is moved by 90 mm from the initial position.

In one preferable embodiment, when formed into a sheet having a thickness of 200 μm, the PP composition realizes a PP sheet having a bending strength in the range of about 1 to 3 N/38 mm at a measuring temperature of 23° C. More preferable is a PP composition that realizes a PP sheet having a bending strength in the range of about 0.8 to 2 N/38 mm at a measuring temperature of 35° C. and a bending strength in the range of about 1 to 3 N/38 mm at a measuring temperature of 23° C. A liner including a PP sheet formed of such a PP composition is preferable as an element of the release-lined PSA sheet which provides high release operability over a wide range of temperature.

Although in this example, the "bending strength of a sheet having a thickness of 200 μm" is used as a guide for a preferable PP composition according to the present invention, the thickness of the PP sheet included in the liner or the release-lined PSA sheet according to the present invention is not limited to 200 μm. The PP sheet included in the liner or the release-lined PSA sheet according to the present invention may be obtained by forming a PP composition, which, as a sheet of 200 μm thickness, has the above-mentioned preferable bending strength, into a sheet having an arbitrary thickness (typically, 50 μm to 300 μm, for example, about 150 μm to 250 μm; may be about 200 μm). For a liner formed of a PP sheet having an uneven structure on a surface thereof, or a release-lined PSA sheet equipped with such a liner, preferable is a PP composition having a bending strength in the above-mentioned range at a predetermined measuring temperature when formed into a 200 μm-thick sheet having the uneven structure (in other words, when formed into a sheet having the same shape as the sheet actually constructing the liner except that the thickness is 200 μm).

At least the surface of the PP sheet on the PSA layer side (the surface to be attached to the PSA layer) may be release-treated (typically release-coated). The release treatment may be substantially the same as the release treatment provided on a surface on the PSA layer side of a general release liner. The release treatment may be provided by, for example, applying any of various conventionally known release agents to the surface of a pre-molded PP sheet. Examples of such release agents include silicone-based release agent, fluorine-based release agent, long-chain alkyl-based release agent, fatty acid amide-based release agent, silica powder, and the like. A surface on the non-PSA layer side of the PP sheet may be release-treated in substantially the same manner as, or in a different manner from, the surface on the PSA layer side. A release liner formed of the PP sheet having a surface release-treated in this manner may also be encompassed in the "release liner formed of the PP sheet".

Figure 2:
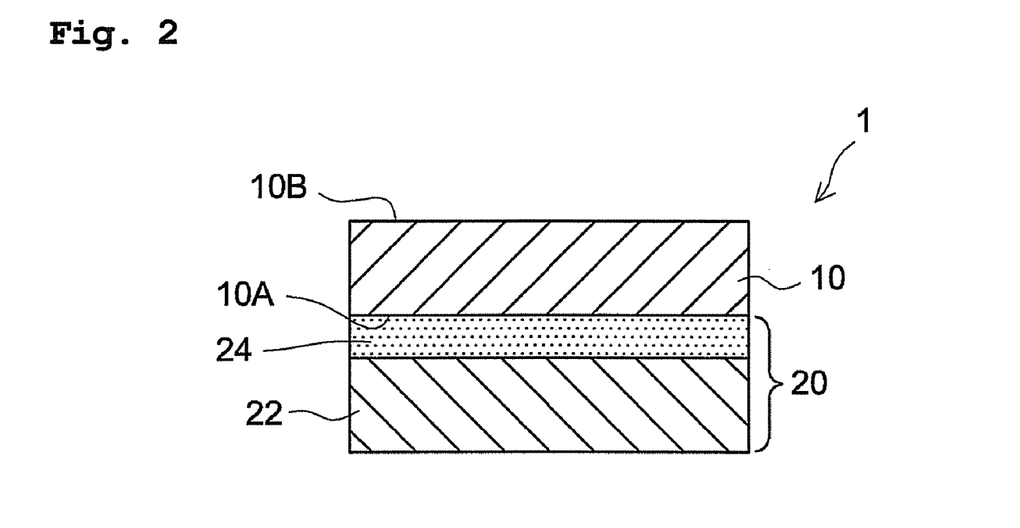
FIG. 2 is a cross-sectional view schematically showing an example of a structure of a release-lined PSA sheet according to the present invention.
Figure 3:
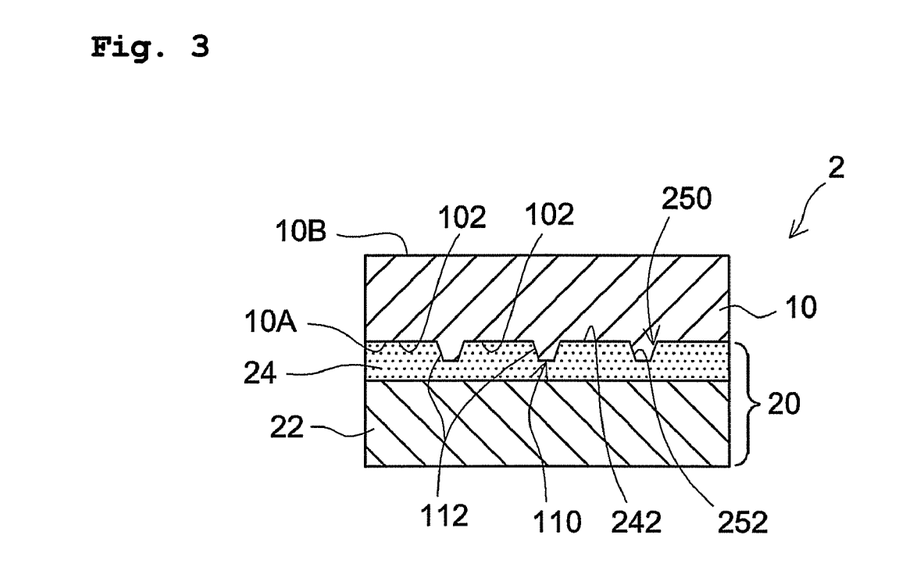
FIG. 3 is a cross-sectional view schematically showing another example of a structure of a release-lined PSA sheet according to the present invention.

A release liner disclosed herein may have, for example, a cross-sectional structure schematically shown in FIG. 2 or 3. Among FIGS. 2 and 3, the elements having similar functions are assigned the same reference numeral.

A release-lined PSA sheet 1 shown in FIG. 2 includes a PSA sheet 20 having a support 22 and a PSA layer 24 provided on one surface of the support 22, and a release liner 10 placed on the PSA layer 24. The liner 10 is formed of a PP sheet. In one preferable embodiment, a surface 10A (release surface) of the liner 10 on the PSA layer side is release-treated. A surface 10B opposite from the PSA layer side (back surface) may or may not be release-treated. In the release-lined PSA sheet 1 in the embodiment shown in FIG. 2, the surface 10A on the PSA layer side of the liner 10 is formed to be smooth (flat). When the liner 10 is released from the PSA sheet 20, the smooth PSA layer 24 reflecting the surface structure of the surface 10A on the PSA layer side is exposed. By press-bonding the PSA layer 24 onto an adherend, the PSA sheet 20 is attached to the adherend.

In a release-lined PSA sheet 2 shown in FIG. 3, a plurality of ridge-like projections 112 extending in one direction are provided (distributed) in parallel to each other at a predetermined pitch on the PSA layer side surface 10A of the liner 10. On the PSA layer side surface 10A, a plurality of projections (not shown) extending in a direction perpendicular to the one direction are also provided (distributed) in parallel to each other at a predetermined pitch (typically, the same pitch as the projections 112). Thus, a lattice-like projection 110 is formed over the PSA layer side surface 10A. Each of the areas surrounded (bounded) by the projection 110 is a relatively recessed square planar area 102. On the surface of the PSA layer 24 facing the surface 10A, the surface structure of the surface 10A is reflected and groove-like recesses 252 and groove-like recesses (not shown) extending perpendicular to the recesses 252 are formed. These recesses are connected at intersections, and thus a lattice-like recess 250 is formed over the surface of the PSA layer 24. Each of areas bounded by the recess 250 is a relatively projected square-shaped planar area 242. The rest of the construction is substantially the same as the release-lined PSA sheet 1 shown in FIG. 2. When the liner 10 is released from the PSA sheet 20, the PSA layer 24 having a lattice-like recess which reflects the surface structure of the surface 10A is exposed. When the PSA layer 24 is press-bonded onto an adherend with an appropriate force, the planar area 242 first closely contact the adherend whereas the channels extending across the length and width remain between the lattice-like recess 250 and the surface of the adherend. Through the channels, the air bubbles trapped at the time of attaching the PSA sheet 20 can be pushed out.

As the support included in such a PSA sheet, for example, any one of the following substances may be appropriately selected in accordance with the use of the PSA sheet: plastic films such as polypropylene film, ethylene-propylene copolymer film, polyester film, polyvinyl chloride film and the like; foam substrates such as polyurethane foam, polyethylene foam and the like; paper such as kraft paper, crepe paper, Japanese paper ("washi") and the like; cloths such as cotton cloth, staple fiber cloth and the like; unwoven cloth such as polyester unwoven cloth, vinylon unwoven cloth and the like; and metal foils such as aluminum foil, copper foil and the like. As the plastic film, either unstretched film or stretched (monoaxially or biaxially stretched) film may be used. Surface treatment such as undercoating, corona discharge or the like may be applied on the surface of the support on which the PSA layer is to be provided. The thickness of the support may be appropriately selected in accordance with the purpose, and is generally about 10 µm to 500 µm (typically, 10 µm to 200 µm).

There is no specific limitation on the type of adhesive used for the PSA layer. The PSA layer may contain one, two or more selected from various conventionally known adhesives including, for example, acrylic, polyester-based, urethane-based, polyether-based, rubber-based, silicone-based, polyamide-based, and fluorine-based ones and the like. There is no specific limitation on the form of the adhesives. The adhesive may be provided in any of various forms including, for example, solvent type, emulsion type, water-soluble type, ultraviolet-curable type and the like. Such an adhesive may contain one, two or more of general additives including tackifier, viscosity modifier, leveling agent, plasticizer, filler, colorant such as pigment, dye or the like, stabilizer, preservative, anti-aging agent, antistatic, and the like.

In one preferable embodiment, the adhesive constructing the PSA layer is an acrylic adhesive containing an acrylic polymer as the base polymer (main component of the polymer components contained in the adhesive). The acrylic polymer is typically a (co)polymer containing, as a main monomer, alkyl (meth)acrylate, i.e., a (meth)acrylic ester of alkylalcohol. Herein, the concept of "(meth)acrylic" encompasses acrylic and methacrylic. A preferable PSA layer contains, for example, an acrylic adhesive composed mainly of an acrylic polymer, wherein the acrylic polymer composed of, as a main monomer, (meth)acrylic ester of alkylalcohol, the alkylalcohol having 2 to 14 carbon atoms (more preferably 4 to 10 carbon atoms). Such a PSA layer may be formed of, for example, an acrylic PSA composition which contains an acrylic polymer comprising the above-mentioned (co) polymer and optionally, a tackifier, a cross-linking agent, a solvent and/or the like.

The thickness of the PSA layer is not specifically limited, but may be, for example, in the range of about 5 µm to 150 µm (typically, about 10 µm to 100 µm). In a release-lined PSA sheet equipped with a PSA sheet and a liner having an uneven structure on the PSA layer side surface, it is preferable that the thickness of the PSA layer of the PSA sheet is approximately equal to, or greater than, the height of the projection on the surface of the liner (distance from the tip of the projection to the bottom of the recess).

The PSA layer may be formed by, for example, directly applying (typically by coating) an appropriate PSA composition to the support and optionally, drying and/or curing the composition (direct method). Then, the release liner is laminated on the PSA layer, thereby forming a release-lined PSA sheet. Alternatively, a release-lined PSA sheet may be produced by applying the PSA composition to a release liner to form a PSA layer on the release liner, and then placing a support over the PSA layer on the release liner to transfer (attach) the PSA layer to the support (transfer method). Similarly, in the case of a release-lined PSA sheet that includes a PSA sheet and a liner having an uneven structure on the PSA layer side surface, by forming a smooth PSA layer on the support, and placing the supported PSA layer on the liner, and optionally pressing, the uneven structure on the surface of the liner can be reflected on the PSA layer. Alternatively, the PSA layer may be formed on the surface of the liner having an uneven structure (on the PSA layer side surface) and then the PSA layer may be transferred to (placed onto) the support.

EXAMPLES

Hereinafter, some examples according to the present invention will be described, but the present invention is not limited to these examples. In the following description, the "part(s)" and "%" are based on mass unless otherwise specified.

Example 1

Production of PP Sheet

Sample 1

100 parts of a homopolypropylene-based resin containing aluminum hydroxy-di-p-tert-butylbenzoate (compound represented by formula 1) as a nucleating agent (trade name "Novatec PP FY6C" available from Japan Polypropylene Corporation), and 10 parts of linear low density polyethylene (LDPE) (trade name "Sumikasen G201-F" available from Sumitomo Chemical Co., Ltd.) were put into extruder. The polypropylene-based resin composition in a melted state was extruded from the T-die (die temperature: 240° C.) of the extruder, and fed and cooled between a processing roll (cooling roll) having lattice-like grooves on the surface and a compressing roll (cooling roll) having a smooth surface, thereby forming a sheet of 200 μm thickness. Thus, a PP sheet for release liner (sample 1) was obtained. Transferring the surface structure (lattice-like grooves) of the processing roll afforded the surface of the PP sheet on the processing roll side (the surface to be attached to the PSA layer) to have ridge-like projections perpendicular to each other distributed at a pitch of 500 μm in both directions. The cross-sectional shape of the projections was trapezoidal with a lower side length of 68 μm, an upper side length of 10 μm and a height of 25 μm.

The thickness of the PP sheet was measured using a dial gauge having a minimum detectable value of 1/1000 mm. The uneven structure on the surface of the PP sheet was detected by observing the surface with a laser microscope (trade name "LEXT OLS3000" available from Olympus Corporation).

Example 2

Production of PP Sheet

Sample 2

Instead of the polypropylene-based resin containing a nucleating agent used in Example 1, was used a homopolypropylene-based resin with no nucleating agent (trade name "Novatec PP FY6" available from Japan Polypropylene Corporation). In substantially the same manner as in Example 1 except for this point, was obtained a PP sheet for release liner (sample 2) having a thickness of 200 μm.

Example 3

Measurement of Bending Strength

The bending strength of sample 1 (a single layer PP sheet formed of a PP composition containing a nucleating agent) and sample 2 (a single layer PP sheet formed of a usual, with no nucleating agent, PP composition) produced as above were measured by the above-described method, using the bending strength measuring apparatus 60 having a structure schematically shown in FIG. 8 (tensile and compression testing machine, trade name "TECHNO GRAPH TG-5kN" available from Minebea Co., Ltd.). For comparison, the bending strength of a release liner constructed with a polyethylene (PE) film laminated on a paper substrate (sample 3; total thickness: 170 μm) was measured in the same manner.

Each sample was cut into a strip of 38 mm width×100 mm length to prepare a test piece. The test piece in a linearly extended state was set vertically between the upper plate 62 and the lower plate 64 of the bending strength measuring apparatus 60. While the lower plate 64 was kept at a fixed position, the upper plate 62 was moved toward the lower plate 64 at a rate of 300 mm/min. until the upper plate 62 was moved by 95 mm from the initial position. From the chart representing the relationship between the moved distance and the compressive force applied to the test piece, the compressive force (bending strength) when the upper plate 62 was moved by 90 mm from the initial position was determined.

The bending strength was measured at measuring temperatures (environmental temperatures) of 5° C., 23° C. and 35° C. The results are shown in Table 1.

TABLE 1

| | Sample thickness | Bending strength [N/38 mm] | | |
|---|---|---|---|---|
| | [μm] | 5° C. | 23° C. | 35° C. |
| Sample 1 (single layer PP with nucleating agent) | 200 | 1.25 | 1.18 | 0.90 |
| Sample 2 (single layer PP with no nucleating agent) | 200 | 1.13 | 0.85 | 0.64 |
| Sample 3 (PE/paper/PE laminated structure) | 170 | 0.93 | 0.80 | 0.67 |

As shown in Table 1, the bending strength of sample 2, i.e., the PP sheet formed of a PP composition with no nucleating agent, was greater than that of sample 3 including a paper substrate at a low temperature (5° C.), but decreased as the measuring temperature increased. As a result, the bending strength of sample 2 was approximately equal to that of sample 3 at 23° C., and was lower than that of sample 3 at 35° C. By contrast, the bending strength of sample 1, i.e., the PP sheet formed of a PP composition containing a nucleating agent, was significantly improved as compared to that of sample 2 (especially at 23° C. and 35° C.). The PP sheet of sample 1 exhibited a bending strength greater than that of sample 3 in all the measuring conditions of 5° C., 23° C. and 35° C. More specifically, the PP sheet of sample 1 exhibited a bending strength in the range of 1 N/38 mm or greater (even 1.1 N/38 mm or greater) at 23° C., and 0.8 N/38 mm or greater (even 0.85 N/38 mm or greater) at 35° C.

Example 4

Production of Release-lined PSA Sheet

Sample 4

A surface of the PP sheet of sample 1 on the side to be attached to the PSA layer (the surface having the lattice-like projection) was release-treated (release-coated) to obtain a release liner. The release treatment was carried out by a usual method using a commercially available general silicone-based release agent.

As the support of the PSA sheet, was prepared a polypropylene-based resin sheet having a thickness of 90 μm. On a surface of the support, an acrylic PSA (2-ethylhexyl acrylate-based solvent-type PSA available from Nitto Denko Corporation) was applied and dried at 100° C. for 1 minute. Thus, was obtained a PSA layer having a thickness of about 35 μm (after drying). The release liner was attached to the PSA layer and press-bonded to each other for 5 minutes under the conditions of a temperature of 23° C. and a pressure of 0.4 N/mm². Thus, was produced a release-lined PSA sheet (sample 4).

The release liner was released from the PSA sheet in the release-lined PSA sheet of sample 4 to expose the PSA layer. The surface structure of the PSA layer was observed with a laser microscope (trade name "VK8510" available from Keyence Corporation). It was confirmed that the surface structure of the release liner was transferred to the PSA layer, and as a result, grooves in a lattice-like pattern having a trapezoidal cross-section with a lower side length of 7 μm, an upper side length of 57 μm and a height of 23 μm were formed over the PSA layer at a pitch of 500 μm in both directions.

Example 5

Production of Release-lined PSA Sheet

Sample 5

Instead of the release liner obtained by release-treating the surface of the PP sheet of sample 1, a release liner obtained by release-treating (release-coating) the surface of the PP sheet of sample 2 was used as the release liner to be attached to the PSA layer. Except for this point, a release-lined PSA sheet (sample 5) was produced in substantially the same manner as in Example 4.

Example 6

Production of Release-lined PSA Sheet

Sample 6

Instead of the release liner obtained by release-treating the surface of the PP sheet of sample 1, the release liner of sample 3 (PE/paper/PE) was used as the release liner to be attached to the PSA layer. Except for this point, a release-lined PSA sheet (sample 6) was produced in substantially the same manner as in Example 4.

Example 7

Evaluation of Release Operability

Figure 5:
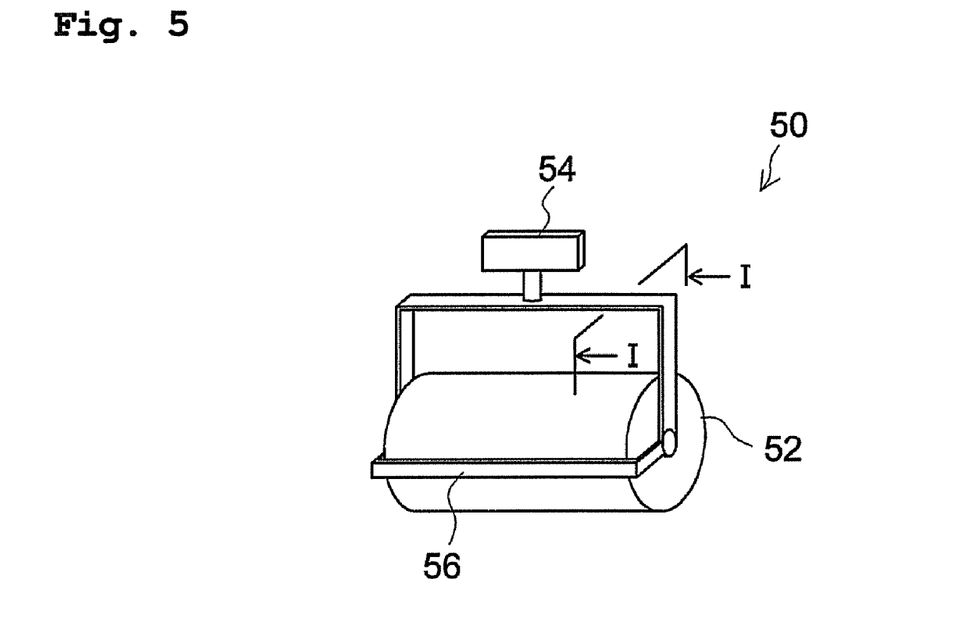
FIG. 5 schematically shows an example of a structure of an attachment apparatus.

Each release-lined PSA sheet sample obtained above was cut into a tape-like shape having a size of 38 mm width×50 cm length to prepare a test piece. The test piece was attached to an adherend using an attachment apparatus 50 having a structure schematically shown in FIG. 5, and the release operability of the release liner included in the test piece (attachment operability of the test piece) was evaluated. The attachment apparatus 50 includes a cylindrical attachment roller 52, a handle 54 for supporting the roller 52 to be rotatable about its axis, and a release guide 56 extending in the axial direction of the roller 52 while keeping a certain space with an outer circumferential surface of the roller 52. The attachment apparatus 50 is used in a state where the release guide 56 is positioned forward of the roller 52 (forward in the advancing direction (leftward in FIG. 1) of the attachment apparatus 50).

Figure 1:
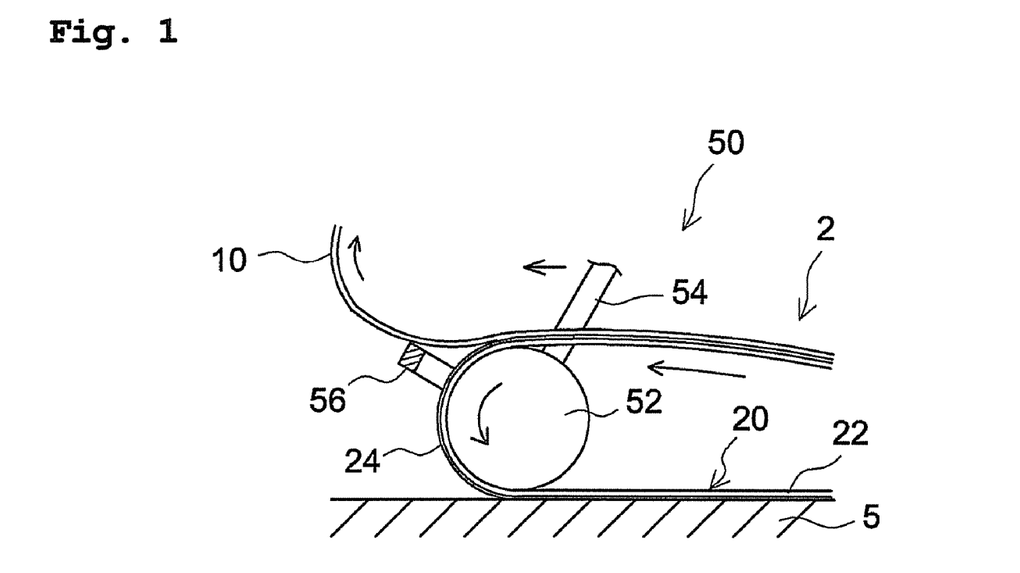
FIG. 1 schematically shows how a release-lined PSA sheet is attached using an attachment apparatus.

The operability was evaluated as follows. As shown in FIG. 1, at the leading end of the length of the test piece (release-lined PSA sheet) 2, the liner 10 was released from the PSA sheet 20 to expose the PSA layer 24. While the released part of the liner 10 was held on (hung over) the top end of the guide 56, the PSA sheet 20 exposing the PSA layer 24 was wound around the outer circumferential surface of the roller 52. One end of the PSA sheet 20 was pressed by the roller 52 from the side of the support 22 to attach the PSA layer 24 on an adherend 5. In this manner, the test piece 2 was set in the attachment apparatus 50. While pressing the roller 52 on the adherend 5, the attachment apparatus 50 was continuously moved at a constant speed leftward in FIG. 1. When the test piece 2 supplied from the right side of the roller 52 proceeded forward in the advancing direction from the upper side of the roller 52, the liner 10 and the PSA sheet 20 were continuously (simultaneously) separated by the release guide 52 and the PSA sheet 20 having the PSA layer 24 exposed by the separation was advanced downward from the front of the roller 52. Accordingly, the PSA sheet 20 was continuously press-bonded on the adherend 5 by the roller 52.

Figure 6:
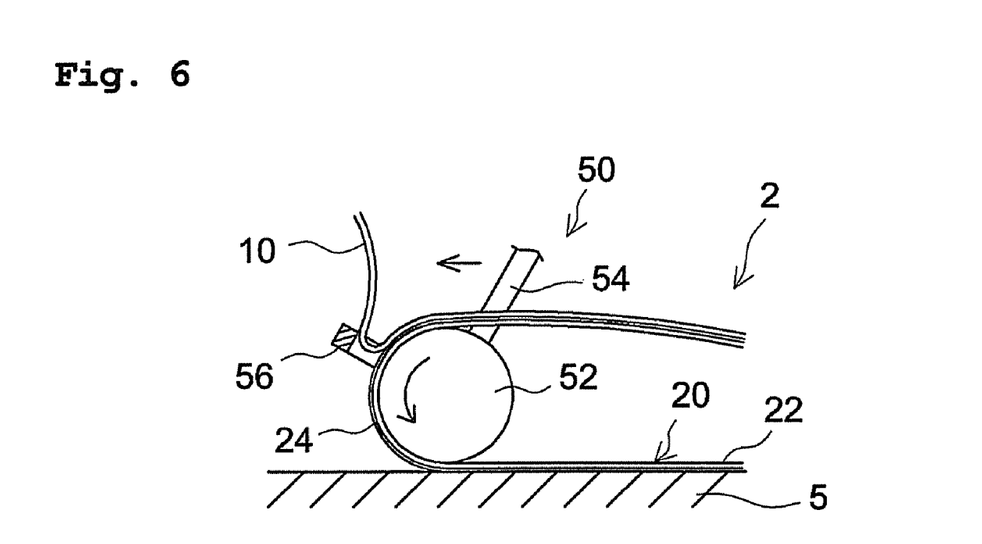
FIG. 6 schematically shows how a release-lined PSA sheet is attached using the attachment apparatus.
Figure 7:
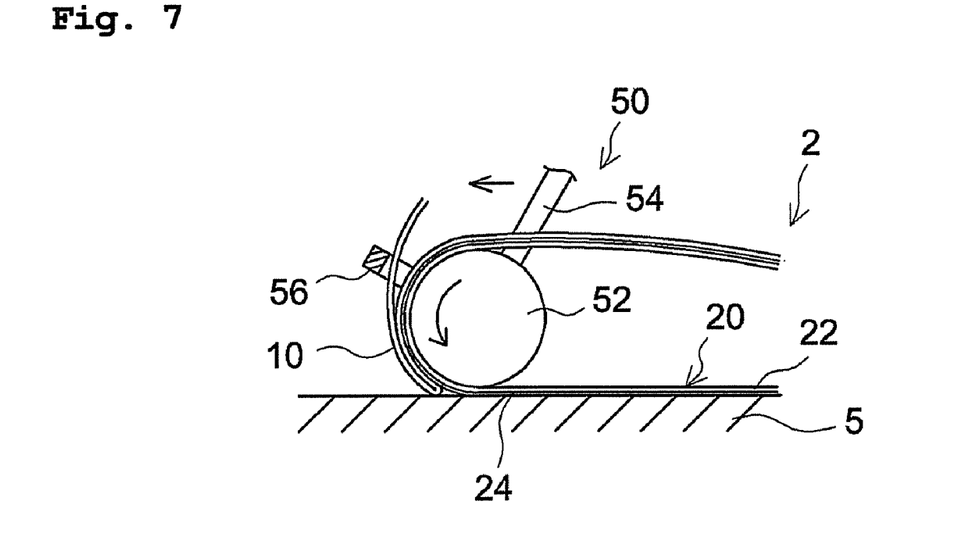
FIG. 7 schematically shows how a release-lined PSA sheet is attached using the attachment apparatus.

In the case of a test piece 2 with excellent operability, as shown in FIG. 1, as the attachment apparatus 50 advances, the release liner 10 spontaneously detaches from the PSA sheet 20 owing to the release guide 56 set at a distance from the outer circumferential surface of the roller 52. The separated liner 10 proceeds over the release guide 56 and is discharged out of the attachment apparatus 50. Since the release liner 10 and the PSA sheet 20 are smoothly separated in this manner, the attachment operation can be carried out with no interruptions throughout the trailing end of the test piece 2. By contrast, in the case of a test piece 2 with poor release operability, as shown in FIG. 6, the release liner 10 is stuck in the space between the guide 56 and the roller 52 and cannot be smoothly released from the PSA sheet 20. For example, the advancement (attachment operation) of the attachment apparatus 50 needs to be stopped in mid-course so that the liner 10 can be pulled out of the space. In an extreme case, as shown in FIG. 7, the liner 10 entangled in the space between the guide 56 and the roller 52 is stuck between the roller 52 and the adherend 5 and the attachment operation cannot be carried out any further.

In this evaluation test, attachment operation was carried out with the test piece cut from each sample, 10 times at each of the attachment temperatures (environmental temperatures) of 5° C., 23° C. and 35° C. The results are shown in Table 2. In Table 2, letter A indicates that in all 10 trials, attachment operation was carried out successfully in the state shown in FIG. 1 through the terminal end of the test piece. Letter B indicates that the state shown in FIG. 6 or FIG. 7 occurred at a frequency of 1 to 3 times out of the 10 times. Letter C indicates that the state shown in FIG. 6 or FIG. 7 occurred at a frequency of 4 times or more out of the 10 times.

TABLE 2

|  | | Release operability | | |
|---|---|---|---|---|
|  | Release liner | 5° C. | 23° C. | 35° C. |
| Sample 4 | Sample 1 (single layer PP with nucleating agent) | A | A | A |

TABLE 2-continued

| Release liner | | Release operability | | |
|---|---|---|---|---|
| | | 5° C. | 23° C. | 35° C. |
| Sample 5 | Sample 2 (single layer PP with no nucleating agent) | A | B | C |
| Sample 6 | Sample 3 (PE/paper/PE laminated structure) | A | A | A |

As shown in Table 2, the release-lined PSA sheet of sample 5 (i.e., the release-lined PSA sheet constructed with the release liner of sample 2) showed excellent release operability at the attachment temperature of 5° C. The release operability declined as the attachment temperature increased. Specifically at an attachment temperature of 35° C., the liner was stuck frequently and thus the operability declined significantly. By contrast, the release-lined PSA sheet of sample 4 (i.e., the release-lined PSA sheet constructed with the release liner of sample 1) maintained an excellent operability at either attachment temperature of 5° C., 23° C. and 35° C., similarly as the release-lined PSA sheet of sample 6(i.e., the release-lined PSA sheet constructed with the release liner of sample 3). In other words, the release liner of sample 1 is excellent in recyclability because it was formed of resin materials of the same type (olefin-based resins); and exhibited excellent release operability (attachment operability) over a wide range of temperature (e.g., even at a high temperature of about 35° C.) similarly as the release liner of sample 3 using paper substrate.

As described above, a release-lined PSA sheet according to the present invention provides excellent release operability (and thus attachment operability) over a wide range of temperature. The release liner included in the release-lined PSA sheet is formed of a PP sheet (polyolefin material), and therefore is excellent in recyclability unlike a release liner including a paper substrate or the like. The release-lined PSA sheet is useful as various types of decorative sheets, for example, paint substitute film (a film used as an alternative to paint) which can be attached to the exteriors of vehicles, decorative sheet, surface protection sheet or the like. The release-lined PSA sheet according to the present invention is preferable for these applications because the paint substitute films (sheets) are strongly desired to provide improved operability in terms of productivity, and are also desired to provide improved operability even in a high temperature environment because the temperature can be relatively high (e.g., 30 to 35° C.) in working environments of plants and the like in summer. The above-described release-lined PSA sheet is also preferably applicable as a sheet that is attached to an adherend continuously (simultaneously) while the liner is released from the PSA sheet by an attachment apparatus (attachment jig). In such attachment operation wherein an attachment apparatus is used, as compared to manual operation, a smooth and stable liner release needs to be realized at a higher level, or inconveniences such as the liner getting stuck is more likely to occur. A release liner according to the present invention is preferably usable for constructing any of the release-lined PSA sheets described above.

What is claimed is:

1. A pressure-sensitive adhesive tape with release liner, comprising:
    a pressure-sensitive adhesive tape including a support and a pressure-sensitive adhesive layer retained by the support; and
    a release liner formed of a polypropylene-based resin sheet and provided on the pressure-sensitive adhesive layer;
    wherein the polypropylene-based resin sheet is obtained by forming a polypropylene-based resin composition containing a nucleating agent into a sheet;
    the polypropylene-based resin composition comprises a blend of a propylene-based polymer and a polyethylene, wherein the content of the polyethylene is 5 to 20 parts by mass with respect to 100 parts by mass of the propylene-based polymer; and
    the polypropylene-based resin composition contains no polymer components other than propylene-based polymer and polyethylene.

2. A pressure-sensitive adhesive tape with release liner according to claim 1, wherein the propylene-based polymer is homopolypropylene.

3. A pressure-sensitive adhesive tape with release liner according to claim 1, wherein the polyethylene is low density polyethylene.

4. A pressure-sensitive adhesive tape with release liner according to claim 1, wherein the nucleating agent is a compound represented by formula (1):

5. A pressure-sensitive adhesive tape with release liner according to claim 1, wherein the polyethylene is a polymer composed mainly of ethylene.

6. A pressure-sensitive adhesive tape with release liner according to claim 1, wherein, when the polypropylene-based resin composition is formed into a sheet having a thickness of 200 µm, the resulting sheet has a bending strength in the range of 0.8 to 2 N/38 mm at a measuring temperature of 35° C., where the bending strength is measured by bending lengthwise a test piece having a width of 38 mm and a length of 100 mm into a U shape by bringing both ends thereof closer to each other at a rate of 300 mm/min until the distance between the ends becomes 10 mm.

7. A pressure-sensitive adhesive tape with release liner according to claim 6, wherein the polypropylene-based resin composition realizes a polypropylene-based resin sheet having a bending strength in the range of 1 to 3 N/38 mm at a measuring temperature of 23° C.

8. A pressure-sensitive adhesive tape with release liner according to claim 1, wherein on the surface of the release liner on the pressure-sensitive adhesive layer side, ridge-like projections having a height of 5 µm to 50 µm are formed in parallel to each other at a pitch of 100 µm to 1000 µm.

9. A pressure-sensitive adhesive tape with release liner according to claim 1, wherein the resin sheet is framed into a sheet by melt extrusion method, wherein the polypropylene-based resin composition containing the nucleating agent is extruded in a melted state and fed to be cooled between rolls while being molded into a sheet.

10. A pressure-sensitive adhesive tape with release liner, comprising:
    a pressure-sensitive adhesive tape including a support and a pressure-sensitive adhesive layer retained by the support; and
    a release liner foamed of a polypropylene-based resin sheet and provided on the pressure-sensitive adhesive layer;

wherein
the polypropylene-based resin sheet is obtained by forming a polypropylene-based resin composition containing a nucleating agent into a sheet;
the polypropylene-based resin composition comprises a blend of a propylene-based polymer and a polyethylene, wherein the content of the polyethylene is 5 to 20 parts by mass with respect to 100 parts by mass of the propylene-based polymer;
the propylene-based polymer is a homopolypropylene and the polyethylene is a linear low density polyethylene;
the polypropylene-based resin composition contains no polymer components other than propylene-based polymer and polyethylene; and
the nucleating agent is a compound represented by formula (1):

(1)

11. A pressure-sensitive adhesive tape with release liner according to claim 10, wherein the polypropylene-based resin sheet has a thickness of 150 μm to 250 μm.

12. A pressure-sensitive adhesive tape with release liner according to claim 10, wherein the polyethylene is a polymer composed mainly of ethylene.

13. A pressure-sensitive adhesive tape with release liner, comprising:
a pressure-sensitive adhesive tape including a support and a pressure-sensitive adhesive layer retained by the support; and
a release liner formed of a polypropylene-based resin sheet and provided on the pressure-sensitive adhesive layer;
wherein the polypropylene-based resin sheet is obtained by forming a polypropylene-based resin composition containing a nucleating agent into a sheet;
the polypropylene-based resin composition comprises a blend of a propylene-based polymer and a polyethylene, wherein the content of the polyethylene is 5 to 20 parts by mass with respect to 100 parts by mass of the propylene-based polymer;
the polypropylene-based resin composition contains no polymer components other than propylene-based polymer and polyethylene; and
the polypropylene-based resin sheet has a thickness of 150 μm to 250 μm.

14. A pressure-sensitive adhesive tape with release liner according to claim 13, wherein the polyethylene is a polymer composed mainly of ethylene.

* * * * *

UNITED STATES PATENT AND TRADEMARK OFFICE
CERTIFICATE OF CORRECTION

| | | |
|---|---|---|
| PATENT NO. | : 8,394,478 B2 | Page 1 of 1 |
| APPLICATION NO. | : 11/858614 | |
| DATED | : March 12, 2013 | |
| INVENTOR(S) | : Ukei et al. | |

It is certified that error appears in the above-identified patent and that said Letters Patent is hereby corrected as shown below:

In the Claims:

Claim 9, column 18, line 56:

"framed" should read "formed"

Claim 10, column 18, line 66

"foamed" should read "formed"

Signed and Sealed this
Fourteenth Day of May, 2013

Teresa Stanek Rea
*Acting Director of the United States Patent and Trademark Office*